United States Patent [19]

Kejr

[11] Patent Number: 4,714,273
[45] Date of Patent: Dec. 22, 1987

[54] VEHICLE FOR TRANSPORTING ELONGATED OBJECTS

[76] Inventor: Melvin P. Kejr, 1704 Cloud Cir., Salina, Kans. 67401

[21] Appl. No.: 816,239

[22] Filed: Jan. 6, 1986

[51] Int. Cl.$^4$ ............................................. B60P 1/02
[52] U.S. Cl. ................................. 280/789; 280/400; 296/181; 414/540
[58] Field of Search ............ 280/414.1, 405 R, 414.3, 280/414.5, 425 R, 789, 400; 410/26, 2, 29.1, 24; 414/540, 541, 542; 296/181, 182, 3

[56] References Cited

U.S. PATENT DOCUMENTS

| | | | |
|---|---|---|---|
| 2,273,503 | 2/1942 | Couse | 280/789 |
| 2,853,309 | 9/1958 | Hubbard | 280/800 |
| 3,192,880 | 7/1965 | Bergstrand | 410/26 |
| 3,870,339 | 3/1975 | Goff | 280/414.1 |
| 3,909,057 | 9/1975 | Guthry | 280/414.1 |
| 4,024,968 | 5/1977 | Schaffer | 414/542 |
| 4,105,219 | 8/1978 | Gerson | 280/414.1 |
| 4,221,420 | 9/1980 | Vencill | 280/414.1 |
| 4,406,477 | 9/1983 | McDonald | 280/414.1 |

FOREIGN PATENT DOCUMENTS 1237622  6/1971  United Kingdom ................. 414/540
2087341  5/1982  United Kingdom ................. 414/540

Primary Examiner—John J. Love
Assistant Examiner—Everett G. Diederiks, Jr.
Attorney, Agent, or Firm—Kokjer, Kircher, Bradley, Wharton, Bowman & Johnson

[57] ABSTRACT

A vehicle for transporting long objects such as combine platforms over highways is disclosed. The vehicle has a main bed with a vertically extending frame at one side. Cantilevered arms on vertical columns of the frame project laterally across the bed and provide support for an upper load. The arms are mounted for sliding movement vertically along the columns and are hoisted into their upper positions by cables trained over a sheave mounted on the end of a fluid piston and cylinder assembly. One side member of the vehicle is considerably shorter than the other side member to permit a combine to be maneuvered into position for directly loading and unloading the platform onto the vehicle. When the first platform is raised into its proper position for transporting, a second combine may be moved into position for directly loading its platform onto the main vehicle bed. The platforms are transported in vertically superposed position.

5 Claims, 6 Drawing Figures

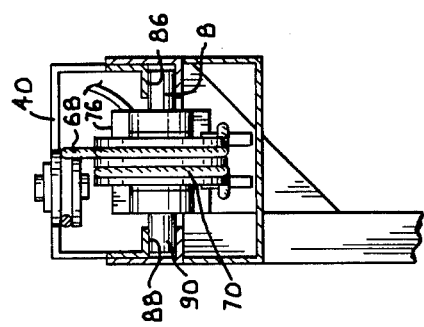
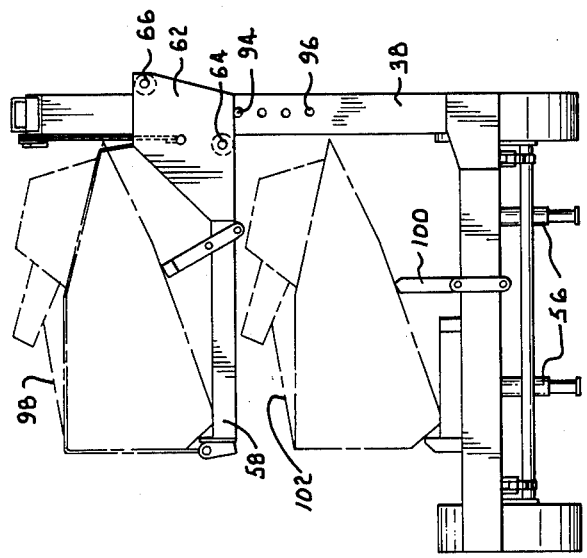
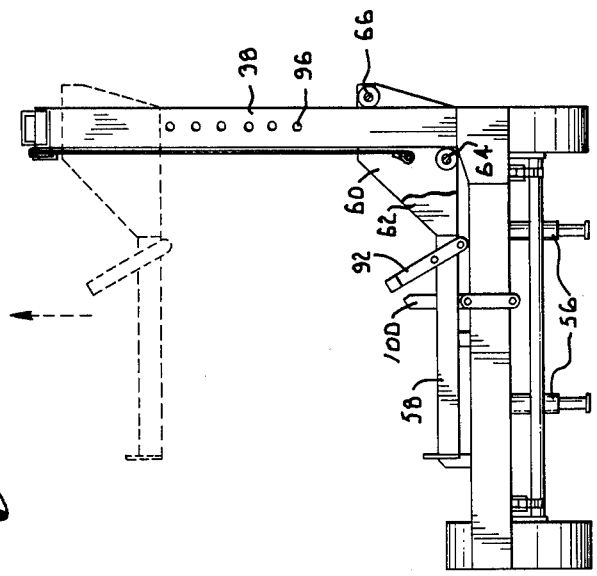
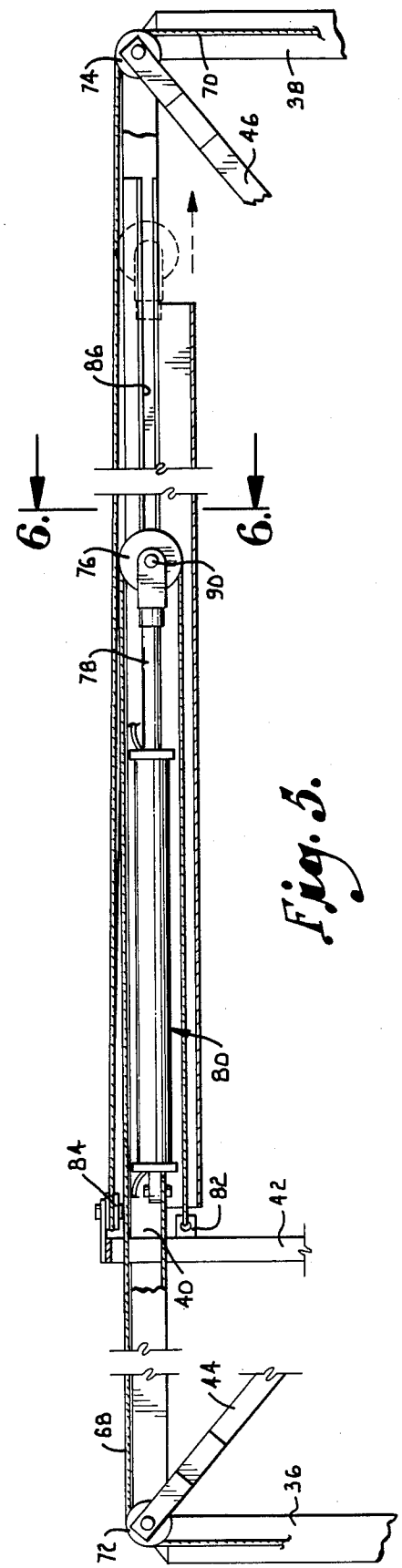

VEHICLE FOR TRANSPORTING ELONGATED OBJECTS

This invention pertains to transporting vehicles, and more particularly to a vehicle especially adapted for transporting elongated, relatively heavy objects such as combine platforms and the like.

The advent of relatively large combines for crop harvesting purposes with extremely wide crop cutting attachments or "platforms" has resulted in a problem of transporting such implements on highways from one harvesting operation to another. Highways are subject to strictly enforced, rigid laws pertaining to the maximum width of any load or vehicle which may be moved over the highways. It is impractical to limit the width of the cutting attachment of harvesting vehicles to only that which is permitted by such laws. Further, it is common practice for harvesting equipment operators to move from one harvesting job to another throughout a relatively large geographical region during the harvesting season to obtain maximum utilization from the equipment investment.

When combine platforms exceeding maximum load widths are utilized, it is necessary to remove such attachments from the combines before the combines can be trucked over the highways. The platforms are usually transported separately in positions extending longitudinally of the transporting vehicle. These platforms may equal or exceed about 34 feet in maximum dimension. Thus, it has often been necessary to utilize a relatively long trailer to transport a single platform from one job to another.

A need exists for a vehicle constructed in a manner to increase the efficiency of the overall operation by doubling the number of platforms which can be transported by a single trailer. The insubstantial rigidity of such items coupled with their relatively large weight and irregular configuration has militated against the stacking of the platforms directly onto one another for transshipment between job sites.

Accordingly, it is a primary object of the present invention to provide a vehicle constructed in a manner to increase the efficiency of transporting elongated objects of this type by permitting two such objects to be safely transported by a single vehicle.

Another object of the present invention is to provide a vehicle for this purpose which permits relatively easy loading of the vehicle with two long objects in superposed position.

Still another object of the present invention is to provide a vehicle wherein two elongated items may be transported in positions which reduce the likelihood of the items sustaining damage.

Yet another object of this invention is to provide a vehicle which is constructed in a manner to permit the loading of two relatively heavy, long objects such as combine platforms directly onto the same vehicle by means of operation of the combine itself.

A further object of the present invention is to provide a vehicle constructed to permit each of the two platforms to be carried thereby to be loaded initially at the same position to eliminate the necessity for auxiliary equipment such as a forklift or the like for installing the platforms onto the vehicle in superposed positions.

These and other important aims and objectives of this invention will be further explained or will become apparent from the following description and explanation of the drawings, wherein:

FIG. 3 is a rear elevational view thereof, parts being broken away to reveal details of construction, and the uppermost position of the support arms being shown in phantom;

FIG. 4 is a view similar to FIG. 3, but illustrating the positions of components with two combine platforms loaded on the vehicle;

FIG. 5 is an enlarged, fragmentary, detailed side elevational view of the extreme top of the vertically extending frame of the vehicle, parts being broken away and shown in cross-section to reveal details of construction, an alternate position of the power cylinder assembly being shown in phantom; and FIG. 6 is a still further enlarged, detailed cross-sectional view taken along line 6—6 of FIG. 5.

Figure 1:
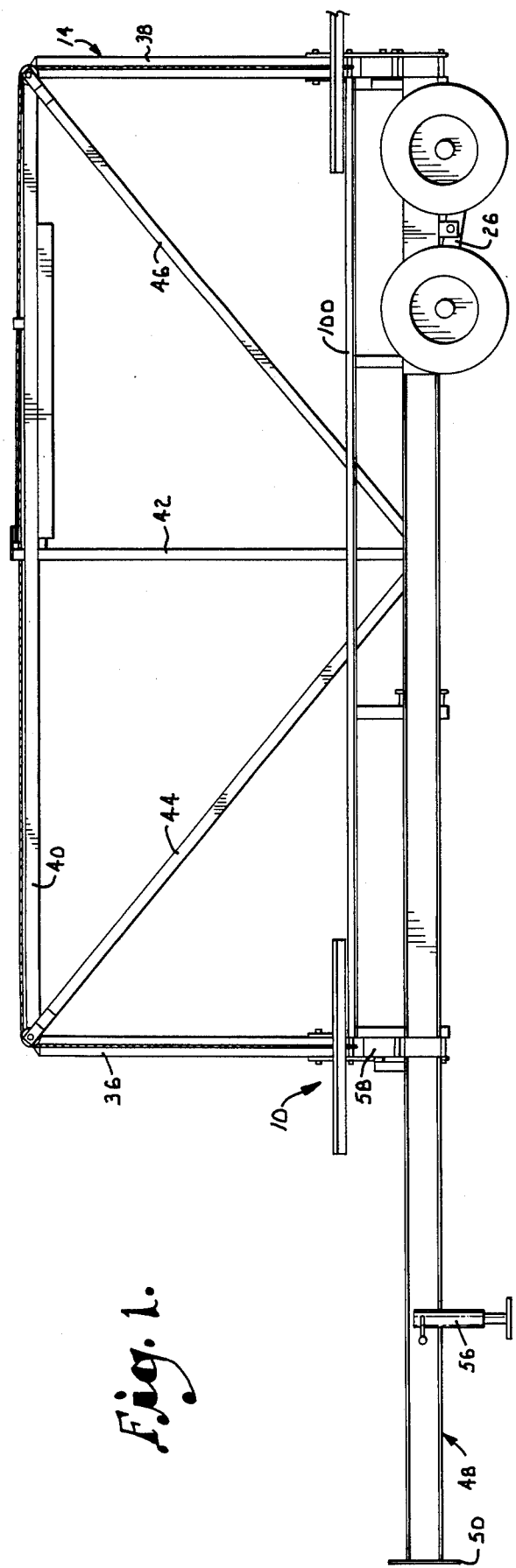
FIG. 1 is a side elevational view of a vehicle embodying the principles of this invention.

A vehicle embodying the principles of this invention is broadly designated in the drawings by the reference numeral 10. The vehicle comprises a substantially flat, horizontally extending bed 12, a vertically extending frame 14 at one extreme side of bed 12, and a pair of wheel and axle assemblies 16 and 18 supporting the bed.

Figure 2:
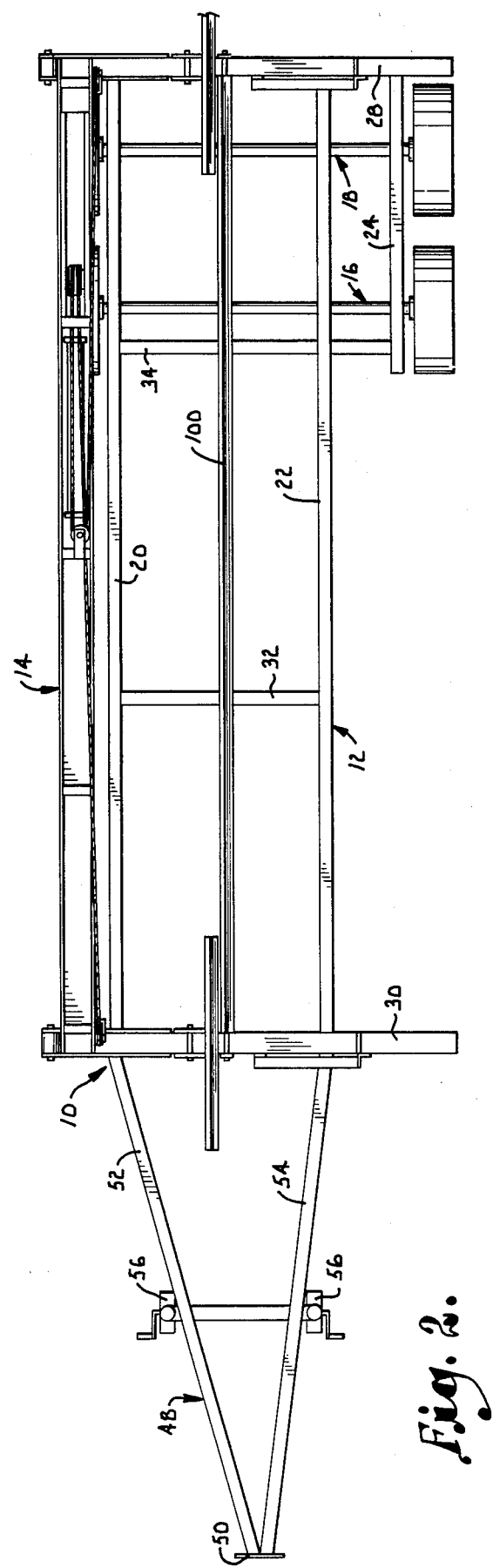
FIG. 2 is a top elevational view thereof.

Bed 12 includes a first elongated, longitudinally extending, rigid frame member 20, a similar, intermediate frame member 22 of equal length to member 20, and a side member 24 at the rear of the vehicle and of substantially shorter length than the members 20 and 22 as shown best in FIG. 2 of the drawing. The wheel and axle assemblies 16 and 18 are interconnected to the side members 20 and 24 by suitable, conventional spring means 26 for supporting the vehicle as will be readily understood by those skilled in this art.

A cross member 28 is welded to the ends of the side members 20 and 24 at the extreme rear of the vehicle. A similar, front cross member 30 is secured in like fashion to side member 20 and intermediate member 22 near the front of the vehicle. Increased stability and rigidity of the bed is provided by cross braces 32 and 34 extending between and secured to the longitudinal members as shown in FIG. 2.

Frame 14 comprises a front vertically extending rigid column 36 carried at one end of the front cross member 30 and an identical column 38 carried by the corresponding end of the rear cross member 28. Columns 36 and 38 are of equal length and are interconnected at the top by an elongated, rigid channel member 40. The stability of frame 14 is further increased by an intermediate, vertical member 42 secured to frame member 20 and extending upwardly therefrom, and by diagonal brace members 44 and 46 which are also secured to side member 20 and to the upper ends of the columns 36 and 38, respectively.

The hitch 48 for vehicle 10 is asymmetrical, but is constructed to locate the towing point 50 symmetrical to side frame members 20 and 24 although the angled hitch members 52 and 54 are attached to front cross member 30 proximal the points of attachments of members 20 and 22, respectively. Jacks 56 support the front end of vehicle 10 when the latter is detached from a towing vehicle as will be understood.

Each column 36 and 38 may be of identical construction. Each column carries a support in the nature of a cantilevered arm 58 which projects laterally across the bed 12 and which is supported on the column by a sleeve telescoped over and slidable along the column. The sleeve is constructed from a pair of spaced apart, identical, irregular shaped plates 60 and 62 welded to arm 58 and carrying rollers 64 and 66 in positions extending between the parallel plates to bear against the corresponding columns supporting any weight carried by arm 58. The rollers also enhance the vertical sliding movement of the sleeves along the columns. Such movement is effected by means of a cable 68 secured to the front arm 58 and a cable 70 secured to the rear arm 58.

Cable 68 is trained over a pulley 72 supported at the top of column 36 and mounted on diagonal brace 44. The rear cable 70 is trained over a pulley 74 supported in like manner by column 38 and brace 46, respectively. Cable 68 extends across one groove of a sheave 76 carried on the outermost end of the rod 78 of a fluid piston and cylinder assembly 80 as shown best in FIG. 5 of the drawing. Cable 68 then returns to a point of attachment to frame 14 at an ear 82 welded to the frame intermediate support member 42 as shown in FIG. 5. The end of assembly 80 remote from sheave 76 is pivotally coupled to frame member 40.

In order for a single assembly 80 to operate both cable 68 and 70, the latter must undergo a change of direction prior to its engagement with sheave 76. Accordingly, cable 70 is trained around a pulley 84 mounted on upright 42 and in a second groove in sheave 76. The cable then parallels cable 68 to an attachment ear 82.

A rectilinear path of travel is assured for the outermost end of assembly rod 78 by means of channels 86 and 88 provided between the projecting legs and bottom flanges of the components making up the construction of channel member 40 as illustrated best in FIG. 6 of the drawing. Lugs 90 project from each side of sheave 76 and ride in the respective channels 86 and 88 as the sheave is moved back and forth along member 40 by operation of assembly 80. The latter may be of the single acting type to raise the arms 58 when the cylinder is extended gravity may be relied upon for retracting rod 78 when the fluid is released from cylinder The arms 58 may, if desired, be constructed of two or more relatively telescoped sections so that the overall lengths of the arms projecting from their respective column 36 or 38 are adjustable. Such construction permits the arms to be manually extended or moved to retracted positions as may be required to accommodate objects of different dimensions. Any of a variety of suitable clamping or locking means may be utilized for releaseably holding the arm sections in the desired positions.

In operation, the arms 58 are permitted to gravitate to the positions thereof illustrated in FIGS. 1 and 3 of the drawing. The operator of a combine can maneuver the vehicle with the cutting platform elevated to overlie the arms 58. The termination of side member 24 at a position substantially coextensive with the leading edge of the proximal wheel of assembly 16 provides clearance at this side of the vehicle for maneuvering the combine to install the first platform on the arms. Each arm may be provided with a selectively movable, diagonally extending brace 92 clamped to the arm and projecting upwardly in position to support the platform as may be required. Obviously, the length, configuration and placement of the braces 92 will depend upon the specific construction of the particular object or platform to be carried by the arms. Once the platform is installed on the arms, it may be detached from the combine and the latter moved away from vehicle 10 for transportation, devoid of its wide platform, by other means to the subsequent job site.

Assembly 80, which may be attached to a source of pressurized fluid such as the hydraulic system of the towing vehicle, is then operated to move sheave 76 to the right as viewed in FIG. 5. This pulls on cables 68 and 70 to hoist the arms 58 to the desired position along the supporting columns. When this position is reached, a pin 94 may be inserted through any appropriate one of a series of aligned holes 96 in the columns to lock the arm against inadvertent gravitation downwardly along the column. Security straps 98 attached to arms 58 may be utilized to fasten the platform on the arms if desired.

Following the loading of the first platform onto the vehicle and in its elevated position, a platform from a second combine may be moved into loading position as has heretofore been described with respect to the first platform. The platform of the second combine is loaded onto bed 12 beneath the first platform. An elongated support member 100 carried by the bed is provided in a position to support the platform as shown in FIG. 4. Once the platform is properly positioned, the combine is disengaged from the platform and is also moved away from vehicle 10 for alternate transportation to the job site. Security strap 102 may be installed around the lower platform for stability and the loaded vehicle is in condition to transport both platforms simultaneously. In superposed position to the next job site.

It will be readily understood by those skilled in the art that the removal of the platforms at the subsequent job site can be effected by simply reversing the loading procedure heretofore described. The lowermost platform is installed onto its combine while on the bed. It is removed from the bed solely by its combine after which support arms 58 are then lowered to the position shown in FIG. 3. The other platform is then attached to and removed from the vehicle by its combine, all without the requirement for auxiliary lifting equipment such as forklifts or the like.

It will be readily understood that modifications of vehicle 10 may be made without departing from the spirit of the present invention. Further, vehicle 10 obviously has a variety of uses for the transporting of long objects in addition to its use for transporting combine platforms described herein in detail. It suffices to say that vehicle 10 is particularly capable of efficiently transporting relatively wide harvesting equipment platforms along major highways.

Having described the invention, I claim:

1. A vehicle for transporting elongated objects, said vehicle comprising:

a horizontally extending, elongated bed including at least one longitudinally extending intermediate member and a longitudinally extending side member spaced laterally from said intermediate member, and front and rear cross members secured to said intermediate member and to said one side member;

wheel and axle means secured to the bed for supporting the latter;

an upright, rigid frame carried by the bed adjacent only one side of the latter extending longitudinally of the bed and including frame components extending upwardly from the bed, the opposite side of the bed being unobstructed by upwardly extending frame components, the bed including a longitudinally extending side member on said opposite side which is substantially shorter than the intermediate member and other side member;

a purality of arms carried by the frame and cantilevered over the bed; and power means for selectively raising said arms relative to the bed to lift an object resting on said arms to a position spaced vertically of the bed to placement of another object on the bed, the relatively short side member providing clearance at the side of the vehicle for the unobstructed raising and lowering of auxiliary lifting apparatus for placing the objects on the arms and bed respectively from the unobstructed side of the bed.

2. A vehicle as set forth in claim 1, wherein the cross beams and the side members are arranged symmetrically with the wheels, and wherein said intermediate member is coextensive in length with said one side member and spaced substantially further from the latter than from said other, shorter side member.

3. A vehicle as set forth in claim 1 wherein said frame includes a pair of vertically extending, rigid columns, there being an arm for each column respectively, and wherein each arm is provided with a sleeve rigidly secured to the arm and telescoped over its corresponding column for sliding of the arms to any selected position vertically along the column.

4. A vehicle as set forth in claim 3, wherein each sleeve is provided with roller means positioned to bear against the corresponding column to minimize the friction during the sliding of the sleeve along the column.

5. A vehicle as set forth in claim 4, wherein each column has a plurality of holes spaced longitudinally therealong, and a pin removably received in a selected hole in disposition to engage said sleeve to prevent inadvertent sliding of the sleeve down the column by gravity.

* * * * *